United States Patent
Lachenmeier et al.

(10) Patent No.: US 8,434,940 B2
(45) Date of Patent: May 7, 2013

(54) ELECTRICAL UNIT WORKING IN ACCORDANCE WITH GALVANIC PRINCIPLES, FOR EXAMPLE A LITHIUM-ION ACCUMULATOR, HAVING A TEMPERATURE SENSOR

(75) Inventors: Walter Lachenmeier, Sankt Augustin (DE); Tim Schäfer, Niedersachswerfen (DE); Andreas Gutsch, Lüdinghausen (DE)

(73) Assignee: Li-Tec Battery GmbH, Kamenz (DE)

( * ) Notice: Subject to any disclaimer, the term of this patent is extended or adjusted under 35 U.S.C. 154(b) by 709 days.

(21) Appl. No.: 12/619,084

(22) Filed: Nov. 16, 2009

(65) Prior Publication Data

US 2010/0124250 A1    May 20, 2010

(30) Foreign Application Priority Data

Nov. 17, 2008   (DE) .................. 10 2008 057 710

(51) Int. Cl.
   *G01K 11/12*   (2006.01)
   *G01K 13/00*   (2006.01)
(52) U.S. Cl.
   USPC ..................................... 374/152; 374/161
(58) Field of Classification Search .............. 374/141, 374/152, 161
   See application file for complete search history.

(56) References Cited

U.S. PATENT DOCUMENTS

| | | | |
|---|---|---|---|
| 5,090,818 A | 2/1992 | Kleinerman | |
| 5,623,196 A * | 4/1997 | Fernandez et al. | 320/153 |
| 7,813,226 B2 * | 10/2010 | Braunberger | 374/106 |
| 2005/0255769 A1 * | 11/2005 | Henninge et al. | 442/59 |
| 2009/0181296 A1 * | 7/2009 | Lampe-Onnerud et al. | 429/160 |
| 2010/0052615 A1 * | 3/2010 | Loncarevic | 320/118 |
| 2010/0104929 A1 * | 4/2010 | Schafer et al. | 429/90 |
| 2010/0109611 A1 * | 5/2010 | Schaefer et al. | 320/134 |

(Continued)

FOREIGN PATENT DOCUMENTS

| | | |
|---|---|---|
| DE | 102006049746 | 4/2008 |
| JP | 5166545 | 7/1993 |
| KR | 100812742 | 3/2008 |

OTHER PUBLICATIONS

Grattan, K.T.V. et al., "Fiber optic sensor technology : an overview," Elsevier Science S.A., Sensors and Actuators A Physical, 82 (2000) pp. 40-61.

(Continued)

*Primary Examiner* — Yaritza Guadalupe-McCall
(74) *Attorney, Agent, or Firm* — Prety Flaherty Beliveau & Pachios LLP (57) ABSTRACT

The present invention relates to an apparatus, which works according to galvanic principles, in particular to a lithium-ion accumulator or, respectively, a lithium-ion cell, with at least two electrode devices (10; 20), in particular, a cathode and an anode, in particular, a separator device (30), arranged between two electrode devices, the apparatus (2) comprises, according to the invention, at least one or a plurality of glass fibers (18, 28, 38) which are configured or, respectively, operable as temperature sensor. It can comprise a net (16, 26, 36) formed by glass fibers, or an arrangement of a plurality of glass fibers, which are arranged substantially in parallel to each other, wherein at least one glass fiber (18, 28, 38) is configured or operable as temperature sensor. Such a glass fiber structure can be arranged at the surface of a separator device (30) and/or the cathode, respectively, anode device (10, 20) and can serve as carrier material for this device (30, 10, 20) or can be embedded into this device.

19 Claims, 5 Drawing Sheets

U.S. PATENT DOCUMENTS

2010/0112417 A1* 5/2010 Schafer et al. .................. 429/50
2010/0112453 A1* 5/2010 Gutsch et al. ............ 429/231.95
2010/0124250 A1* 5/2010 Lachenmeier et al. ....... 374/152
2012/0155507 A1* 6/2012 Srinivasan et al. .............. 374/45

* cited by examiner

ELECTRICAL UNIT WORKING IN ACCORDANCE WITH GALVANIC PRINCIPLES, FOR EXAMPLE A LITHIUM-ION ACCUMULATOR, HAVING A TEMPERATURE SENSOR

The present invention relates to an apparatus, which works according to galvanic principles, in particular to a lithium-ion cell or, respectively, to a lithium-ion accumulator with a temperature sensor.

Recently developed batteries or accumulators, in particular lithium-ion accumulators, feature a high energy storage density, which on the one hand facilitates the provision of high charge- or, respectively, current capacities, but on the other hand leads to a heating of the accumulator during the charge or, respectively, the discharge operation, as well during charging as well as during discharging of the battery or, respectively, the accumulator. Excessive heating leads to a reduction of the capacity of the accumulator, and to an impairment of the rechargeability and a reduction of the numbers of possible discharge and recharge cycles, with other words to a reduction of the life time of the accumulator. In particular, the skilled person knows the problem of "thermal run-away" in the context of lithium-ion accumulators, wherein a temperature increase in the accumulator amplifies itself starting from a certain threshold temperature, which can lead to a self-destruction of the accumulator, if there is no counter-action taken against said process.

In the recent time, battery management systems for the monitoring and controlling of the operation of lithium-ion accumulators have been developed, with the aims, to guarantee or, respectively, improve the safety at the operation of lithium-ion accumulators, to increase the life time of lithium-ion accumulators and to optimize the charge or, respectively, discharge operational parameters of lithium-ion accumulators with respect to the optimization of the foresaid aims. Such battery management systems not only monitor the electrical operation parameters of a lithium-ion accumulator, but also its temperature by the utilization of common temperature sensors, which are arranged at the lithium-ion accumulator. Typically, the temperature sensors are mounted at an outside of the housing of the housing of a lithium-ion accumulator, such that a heating, in particular and excessive heating or even a local overheating at the elements of an accumulator, which are arranged within the housing and are carrying current, cannot be detected directly or, respectively, only with a delay.

The object underlying the present invention is to enhance and improve the possibilities of diagnosis for monitoring the operational status of a lithium-ion accumulator, in particular also to enhance and improve the generation of measurement quantities for a battery management system.

The object is solved by an apparatus according to claim 1, which works according to galvanic principles. The apparatus concerns in particular a lithium-ion cell or, respectively, a lithium-ion accumulator with, in particular, at least two electrode devices, such as a cathode and an anode, and a separator device, which is arranged between the at least two electrode devices.

According to the invention, the apparatus comprises at least one glass fiber, which is configured or, respectively, operable as a temperature sensor, or a plurality thereof. Such a glass fiber offers the advantage that the temperature is measurable almost without a temporal delay or, respectively, a measurement idleness due to the small heat capacity of the glass fiber. This is beneficial for a temporally resolved monitoring of the operating temperature of the accumulator and for deriving of an actuating variable for a battery management system, in particular a charge controller. Due to the small dimension of a glass fiber, the same can also be very precisely positioned at such a position, where, in particular, short-term temperature changes are particularly pronounced.

An accumulator herein is understood to be an apparatus, which consists of one or multiple internal cells, or, respectively, electrical storage cells, wherein in a respective cell chemical energy is converted to electricity, or electrical energy, respectively, and wherein the apparatus is used as a source of electrical power.

A cell herein is understood to be an electrochemical unit of an accumulator. As a rule, a cell comprises two electrodes, in particular a cathode and an anode, as well as a separator device, which is arranged between the electrodes. The electrodes and the separator are arranged within a gas-tight enclosed housing or, respectively, container. The container further contains an electrolyte or, respectively, and electrolytic liquid, into which the electrodes and the separator are emerged.

A separator device herein is understood to be a surface-like formed device for the separation or, respectively, division of the electrodes of an electrochemical cell, in particular of a lithium-ion cell. The separator device comprises a porous functional layer, which, in particular, fulfils the tasks to take up a partial quantity of the electrolyte, to conduct lithium-ions through the same, or let them diffuse through the same, and to serve as an electrode barrier.

A glass fiber herein is understood to be a fiber made from glass for the guidance of light, which is configured for the guidance of light, in particular laser light, and which is thin cylinder-shaped, with other words a so-called light guide fiber or optical fiber.

A glass fiber, which is operable as temperature sensor, is herein understood to be a glass fiber or, respectively, a light guide fiber, which is configured such that a characteristic is measured by an optical measurement, such characteristic being dependent from the temperature and influencing the light propagation in the glass fiber. In particular, the optical characteristic can comprise the characterization of light, which was generated by an inelastic scatter process of molecules of the glass fiber, such as Raman scattering or Brillouin scattering.

A first portion of the at least one glass fiber, the portion being configured, or, respectively, operable as temperature sensor, can be arranged within a housing device of the apparatus and a second portion of the glass fiber can be arranged outside of the housing device. The arrangement of the first portion, which is configured or, respectively, operable as temperature sensor inside the housing device allows for the measurement of the temperature in situ, e.g. directly at a measurement position within the inside of the housing device, where the heat generation directly occurs and, thus, can be detected at an early stage. Due to the arrangement of the second portion of the glass fiber outside from the housing of the device, the information on the temperature, which is measured inside the housing, is transferred optically towards outside, e.g. via the measurements of a light modulation or, respectively, intensity, in a manner, which is substantially interference-free with respect to electrical or electromagnetical influences, for the evaluation of the temperature.

A corresponding temperature measurement or, respectively, monitoring apparatus can be arranged outside from the housing device and the second portion of the glass fiber can be arranged in optical communication with the temperature measurement apparatus. The measurement apparatus can be provided with an optical multiplex device, which allows to choose a specific glass fiber from a plurality of connected glass fibers, which are configured or, respectively, operable as temperature sensor, and to receive the required optical measurements or, respectively, the measurement of the light modulation, for the acquisition of the information on the temperature of the temperature sensitive portion of the glass fiber, which is arranged in situ.

Further advantages of the temperature measurement by means of a glass fiber, which is configured as a temperature sensor, are the following. In a temperature sensitive portion of the glass fiber inside the housing device, the information on the temperature is transferred optically, and in any case potential-free, that means without an electrical operational connection, from the temperature sensitive portion inside the housing device towards the outside of the housing device, in particular to a measurement apparatus, which is arranged outside from the housing device. Thereby the temperature measurement is also possible at high electrical potentials, which can occur during operation of an apparatus, which works according to galvanic principles. Also, at the measurement and evaluation of optical properties of the light, which is emitted from the glass fiber, no interferences, which influence the temperature measurement, can occur by electromagnetical fields, which may prevail in the temperature sensitive portion. Eventually, the types of the temperature measurement, which are based on the measurement of inherent optical properties of the light, which is emitted by the glass fiber, can also be utilized, if the temperature sensitive portion or, respectively, the apparatus, which works according to galvanic principles, from which the glass fiber is led out, is located in an explosive area.

The at least one glass fiber can guide light at least in a portion of the glass fiber, the light being prepared or, respectively, modulated for the execution of a temperature measurement, or light, which is changed by the influence of the temperature with respect to the preparation or modulation of the same, or light, which is prepared or, respectively, modulated for the transfer of data. Thereby, the glass fiber can not only serve for the temperature measurement, but also for the transfer of data to other measurement- or control devices, for example, which are arranged within the housing device.

The apparatus can comprise one, two, three or an arbitrary plurality of glass fibers, which are configured or, respectively, operable as temperature sensors. For example, the apparatus can comprise a temperature sensor, which is configured as glass fiber, in particular at one or both electrode devices, at an electrode device and the separator device, or at both electrode devices and the separator device. Thus, the temperature can be measured or, respectively, monitored at the same time at multiple positions or, respectively, multiple elements of the apparatus.

The apparatus can comprise a net formed by glass fibers or an arrangement of a plurality of glass fibers, which are arranged in parallel to each other, substantially. Within the net or, respectively, the arrangement, at least one glass fiber or a plurality of glass fibers can be configured or, respectively, be operable as temperature sensors. Thereby, a spatially resolved temperature measurement becomes possible, or, respectively, a measurement of the temperature distribution over the area, which is occupied by the net or, respectively, the arrangement, and not only one temperature measurement at one position, as it was the case for common temperature sensors.

One or a plurality of glass fibers can be arranged in the apparatus at a surface of the separator device or can be embedded at least in one portion of the separator device, said portion being, in particular, surface-like. In particular, the separator device can comprise a net made of glass fibers, wherein at least one or multiple glass fibers are configured or, respectively, operable as temperature sensor. Thereby, a multiple-use of the glass fibers is possible, namely, at the one hand, the use as a temperature sensor for the measurement of the temperature in situ inside the apparatus and, at the other hand, the use as a porous carrier material for the separator device. The net can be a mesh of glass fibers. A respective glass fiber can provide a thickness in an order of magnitude of 10 µm. With such a mesh or, respectively, micro-mesh, which is, for example, being recently developed at the "Institut für Textiltechnik" in Aachen, it is allowed for a more homogeneous pore distribution in the separator device than it is possible with a common separator material, such as Separion®. In such a mesh, one or multiple glass fibers, which are configured as temperature sensor, can be embedded or, respectively, weaved in, in particular, in even distances. Such a mesh can be flowed on a separator device or can be embedded therein. With such a mesh, it is allowed for a spatially resolved temperature measurement or, respectively, a measurement of the temperature distribution in the area of the separator device.

In the apparatus, also one or a plurality of glass fibers, which are configured or, respectively, operable as temperature sensors, can be arranged at a surface of at least one of the electrode devices or can be embedded into at least one of the electrode devices. Thereby, a temperature measurement in situ is allowed for those positions, where the heat is generated by electrochemical processes or the production of current, respectively.

In the aforesaid embodiment, a structure of glass fibers, which are arranged in parallel to each other or a net made from glass fibers can be floated on at least one of the electrode devices or can be embedded into the same, wherein at least one of the glass fibers is configured or, respectively, operable as temperature sensor. Thereby, a functional two-fold use of the glass fibers is again possible, namely, at the one hand, as carrier matrix for the electrode device and, on the other hand, for the temperature measurement, and, in particular, in the case of the configuration of multiple glass fibers, as a temperature sensor for the spatially resolved temperature measurement in the region of the structure or the net, respectively.

The at least one electrode device can comprise a layer of an active electrode mass and a current arrester device, which stands in an electrically conductive connection with said layer. The at least one glass fiber or the structure or, respectively, the net of glass fibers, from which at least one is configured or, operable, as a temperature sensor, can be embedded into the layer of the active electrode mass or can be floated thereon or can be floated at least onto a portion of the current arrester device or embedded, or can be arranged at the interface between the active electrode mass and the current arrester device. A special lead-through of the glass fiber or, respectively, the glass fibers through the wall of the housing device or, respectively, the mounting of a corresponding lead-through device into the housing wall can be set aside in the case that the at least one glass fiber or the structure made of glass fibers or, respectively, the net is embedded into the current arrester device or floated thereon, because the current arrester device is led through the housing device of an accumulator towards outside of the housing device, anyway.

In particular, the apparatus comprises at least one housing device, as a rule. Thereby, the at least one glass fiber or a first portion of the glass fiber for a respective glass fiber, respectively, the portion being configured or operable, respectively, as temperature sensor, in the case of a structure or a net made from multiple glass fibres, respectively, can be attached at (or in) one of the electrode devices, respectively, or, in the separator device, respectively, and a second portion of the glass fiber can be attached at (or in) the housing device, respectively. Thereby, the at least one glass fiber or the structure or the net of glass fibers, respectively, serves not only for the temperature measurement, but also for fixating of the electrode device or the separating device within the housing device, respectively.

For a respective glass fiber, which is configured or operable as temperature sensor, respectively, a luminescent crystal can be arranged in at least one portion of the glass fiber, the crystal standing in optical communication with a core region of the glass fiber, which is capable of guiding light. In particular, the crystal can provide luminescence characteristics, which are capable to be measured with optical measurements and/or which are temperature dependent.

In a first embodiment of the crystal, the wavelength of the luminescence light, which is generated in the crystal, can depend on the temperature of the crystal. In particular, the crystal can contain Al:GaAs. Thereby, the change of the wavelength in dependence on the temperature can be measured for such light, which is continuously radiated in, or for such light, which is radiated in by pulses.

In a second embodiment of the crystal, the decay time of a luminescence light intensity can depend on the temperature of the crystal, said luminescence light intensity having been excited in the crystal by light, which is radiated with respect to its intensity, in particular excited by a light pulse. In particular, the crystal can contain ZnS or Cr:YAg. Thereby the decay time can be determined by an averaging of repeated independent measurements, for the improvement of the accuracy of the measurements.

In another embodiment and in the case of the application of another principle of temperature measurement, which is based on an optical method, a so-called Fiber-Bragg-grate can be configured in at least one portion of the at least one glass fiber, which is configured or operable as temperature sensor and which stands in optical communication with a light guiding core region of the glass fiber. Herein, a Fiber-Bragg-grate is understood to be a periodical variation of refractive indices, which, in particular, is configured in longitudinal direction of the glass fiber. In said embodiment, the periodical variation of the refractive indices acts as a wavelength selective mirror in the reflection mode, and, respectively, as a wavelength selective optical filter in the transmission mode, which does not transmit the reflected part of a irradiated wavelength distribution. The wavelength of the reflected light or, respectively, the light, which is blocked in transmission, is proportional to the geometrical distance of the periodical variations of the refractive indices, determines the period length, which depends on the temperature by the temperature dependent extension or, respectively, contraction of the glass fiber.

Figure 3:
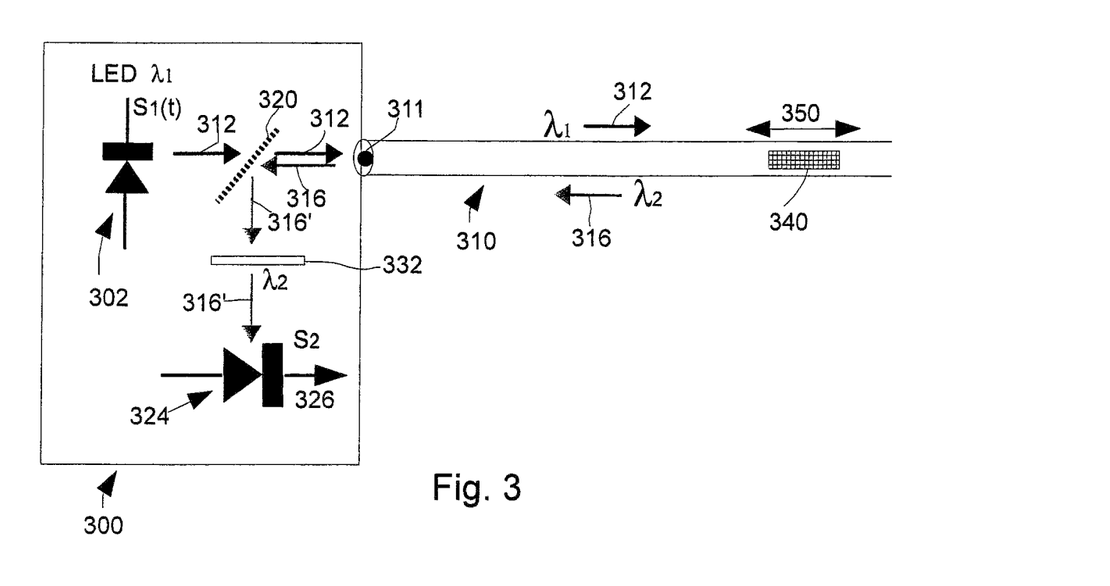
FIG. 3 shows a schematic arrangement for the measurement of temperature dependent luminescence properties of a glass fiber, which is configured as temperature sensor by the provision of a luminescence crystal.
Figure 4:
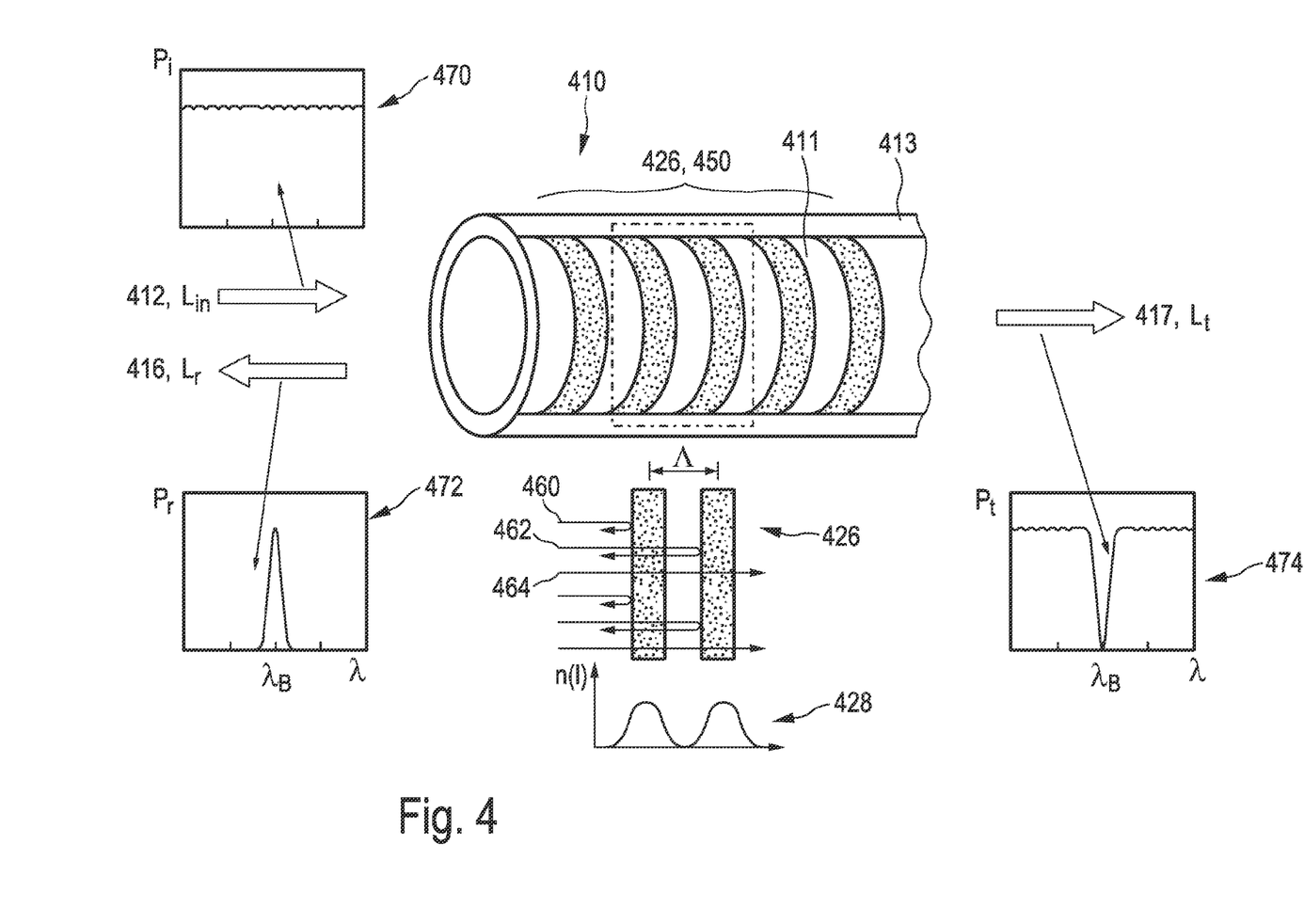
FIG. 4 is a scheme of the measurement principle for the operation of a glass fiber as temperature sensor, which is configured as temperature sensor by the configuration of a Fiber-Bragg-grate.

The principle of the optical temperature measurement, which uses a luminescent crystal, is explained further down with reference to FIG. 3, and the measurement principle, which uses a Fiber-Bragg-grate, with reference to FIG. 4 more in detail.

In a further embodiment, at least one glass fiber, at least in one portion, can be operated as a Raman-FiberFiber sensor device for the temperature measurement or as Brillouin-FiberFiber sensor device. Raman- or, respectively, Brillouin-scattering are inelastic scattering processes, which take place in crystal lattices, such as that of a glass fiber, upon a radiation of light, anyway. A measurement or, respectively, optical characterization of the light, which was generated by said inelastic scattering processes, does not require a structural configuration of the temperature sensitive area of the glass fiber, as, for example, the provision of a luminescent crystal or the configuration of a Fiber-Bragg-grate; the supply of a glass fiber itself is sufficient. The operation as a Fiber-sensor-device or as Brillouin-FiberFiber sensor device can comprise a spatially resolved operation, which is directed on a temperature sensitive area of the glass fiber and which is based on a travel time measurement of light pulses.

Further advantageous embodiments and advantages of the invention can be derived from the following description with reference to the attached figures. It is shown.

Figure 1:
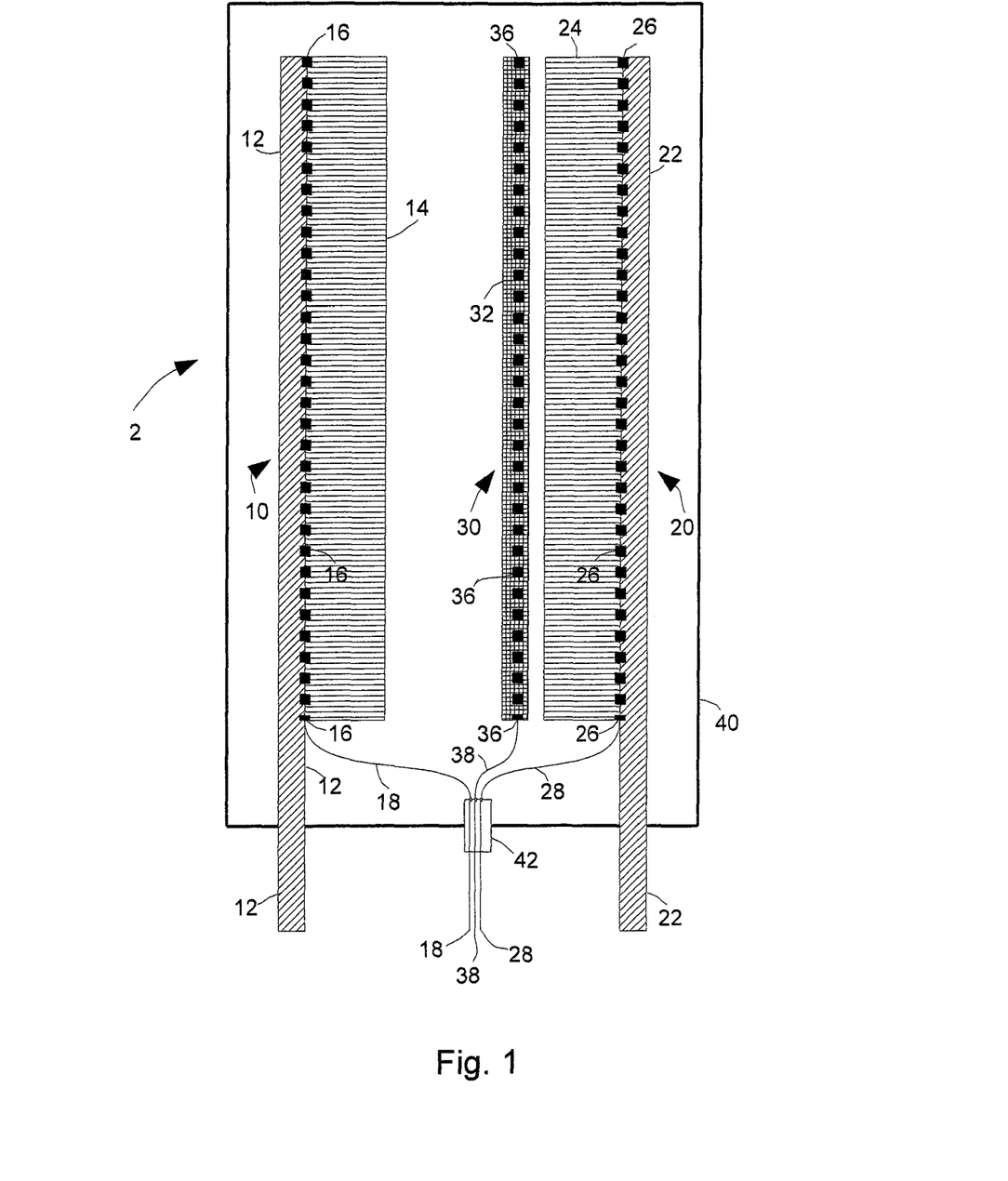
FIG. 1 shows a schematic cross-section through an apparatus according to the invention, which works according to galvanic principles.

FIG. 1 shows, in a schematic cross sectional view, a lithium-ion cell 2, as embodiment of the apparatus according to the invention. The lithium-ion cell 2 comprises a cathode 10 with a current arrester 12, a cathode active layer or respectively, cathode active mass 14, and a glass fiber structure 16; an anode 20 with an anode current arrester 22, an anode active layer or, respectively, anode active mass 24, and a glass fiber structure 26; a separator device 30 with an appropriately chosen separator material 32 and a glass fiber structure 36; a housing device 40 with a lead-through 42 for the leading through of glass fibers from an inside of the housing to an outside of the housing; one or more sensor fibers 18, which lead to the cathode 10, one or more sensor fibers 28, which lead to the anode 20, and one or more sensor fibers 38, which lead to the separator device 30. The housing device 30 is filled with an electrolyte liquid (not shown), which surrounds the electrode 10, the anode 20 and the separator 30 and which causes an electrochemical operational connection between said elements.

The glass fiber structure 16 of the cathode, provided according to the invention, is provided close to an interface or, respectively, contact surface between the active mass 14 of the cathode and the current arrester 12 of the cathode. The glass fiber structure 16 is configured as a weaved net of glass fibers and the net contains multiple glass fibers, which are configured as temperature sensors, which are arranged parallel to each other, and which extend in a direction along the extension of the net. The glass fibers or, respectively, sensor fibers 18, which are configured as temperature sensors, extend also outside from the glass fiber structures 16 and are led towards outside or, respectively, outside of the housing 40 via the glass fiber lead-through 42, which is arranged in the housing wall 40. In a similar embodiment, the glass fiber structure 26 of the anode is arranged at the interface between the active mass 24 of the anode and the anode current arrester 22 and contains a plurality of glass fibers 28, which are configured as temperature sensors. The glass fibers of the anode glass fiber structure 26, which are arranged as temperature sensors, extend also towards outside of the glass fiber structure 26 and are also led to towards outside through the glass fiber lead-through 42.

The glass fiber lead-through 42, shown in FIG. 1, is embedded gas-tight in the wall of the housing 40 or, respectively, seales such that the housing 40 is configured overall gas-tight.

The separator device 30 comprises a functional layer of a porous separator material 32, into which a glass fiber structure 36 is embedded. The glass fiber structure 36 contains also a plurality of glass fibers 38, which are configured as temperature sensors, which are arranged in parallel to each other and which extend in a direction through the separator material. The sensor fibers 38 extend also outside of the glass fiber structure 36 and are also led through the glass fiber lead-through 42 towards outside of the housing 40.

The cathode glass fiber structure 16, the anode glass fiber structure 26 and the separator glass fiber structure 36 are realized as a mesh of glass fibers with a thickness in the order of magnitude of about 10 μm, respectively.

The glass fiber structure 36 serves as a carrier matrix at the fabrication for the application of the separator material 32.

The glass fiber structure 16 or, respectively, 26 of the cathode 10 or, respectively, anode 20 can also be embedded completely in the active mass 14 or, respectively, 24 of the cathode or, respectively, anode, as an alternative to the embodiment described above and in FIG. 1.

Alternatively, the glass fiber structure 16 or, respectively, 26 of the cathode or, respectively, the anode, can also be embedded completely into the current arrester 12 or, respectively, 22 of the cathode or, respectively, the anode, wherein the glass fibers, which are configured as temperature sensors, are led out from the housing 40, while they are embedded in the respective current arrester. This embodiment offers the advantage that a special glass fiber lead-through, such as the element 42 shown in FIG. 1, for the lead-out of glass fibers from the housing 40 can be set aside, if no glass fibers are provided in the separator device, which are configured as temperature sensor.

Figure 2:
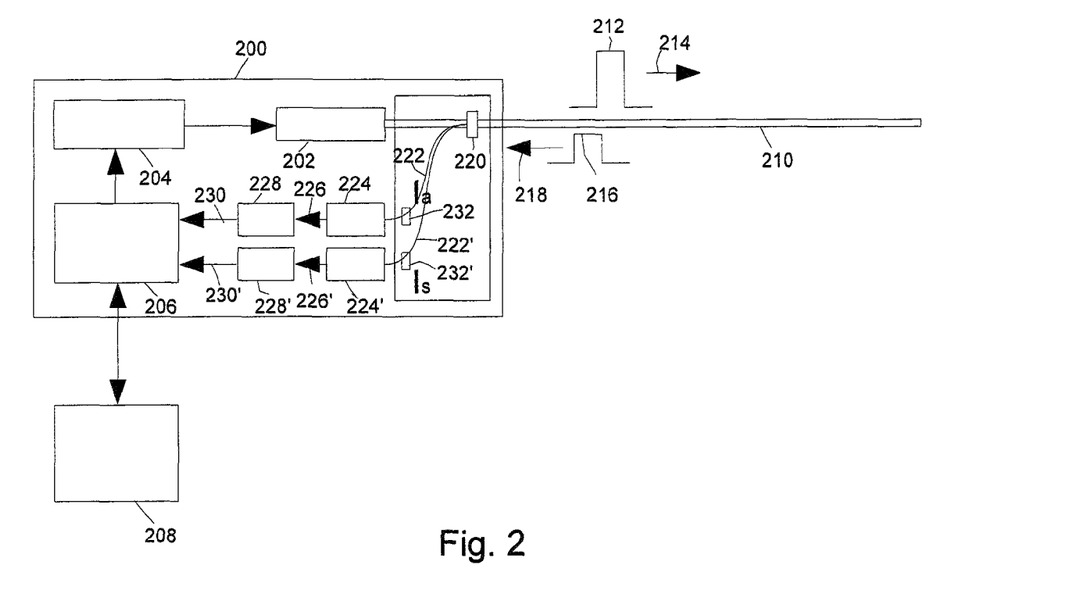
FIG. 2 shows a schematic block diagram of a measurement apparatus for the execution of a measurement of an optical property, which depends on the temperature, of a glass fiber, which is configured or, respectively, operable as temperature sensor.

FIG. 2 shows a schematic block diagram of a measurement apparatus 200 for the operation of glass fiber 210, which is configured or, respectively, operable as temperature sensor. The measurement apparatus 200 comprises a laser 202 as the light source, which generates light in the form of a light pulse 212, in particular, and transfers the same into the sensor fiber 210; a control unit 202 for controlling or, respectively, operating of the light source (laser) 202; a light out-coupling device 220 for coupling out of returning light (in the direction, which is shown in FIG. 2 by the dart 218), which has the form of a light pulse (measurement light pulse) 216 to be received, from the sensor fiber 210 in the measurement light-guide 222, 222'; in particular, the measurement light-guides 220, 220' for the transfer of light, which was coupled out and received, in dependence on the principle of the optical temperature measurement, also filters 232, 232' as required, and if applicable; photodetector/s 224, 224', which convert the light signals to be received into electrical signals and put the same out as detector output signals 226, 226'; signal amplifier 228, 228', which amplify or, respectively, transform the detector output signals 226, 226' to generate amplifier output signals 230, 230'; a sampling- and value-determination unit 206, which receives the amplifier output signals 230, 230' as input, and a computer 208, which is connected to the unit 206 for the controlling and reads out of the sampling- and value-determination unit 206 by a mode of bi-directional exchange of signal or, respectively, data. The measurement apparatus 200, in particular the light source 202 and the light out-coupling device 220, are connected to the end of the glass fiber (sensor fiber) 210, which is led out from the inner space of a housing of a lithium-ion cell.

A measurement light guide 222, a possibly required optical filter 232, a photodetector 224, a signal amplifier 228 as well as an input together with the assigned input- or, respectively, evaluation electronics within the sampling and value determination unit 206, are forming a light measurement channel, respectively. In dependence on the applied measurement principle for the measurement of the temperature in the temperature sensitive portion of this sensor fiber 210, one or two light measurement channels are required and provided.

In the following, an embodiment of the measurement apparatus for the operation of the light-guide fiber 210 as Raman-Fiber sensor device or as Brillouin-Fiber sensor device is exemplarily described with reference to FIG. 2 and FIG. 5. At the operation of the sensor fiber 210 as Raman- or, respectively, Brillouin-Fiber sensor device, a high-power laser 202 generates monochromatic light pulses 212 with high intensity I and a frequency $f_L$.

Figure 5:
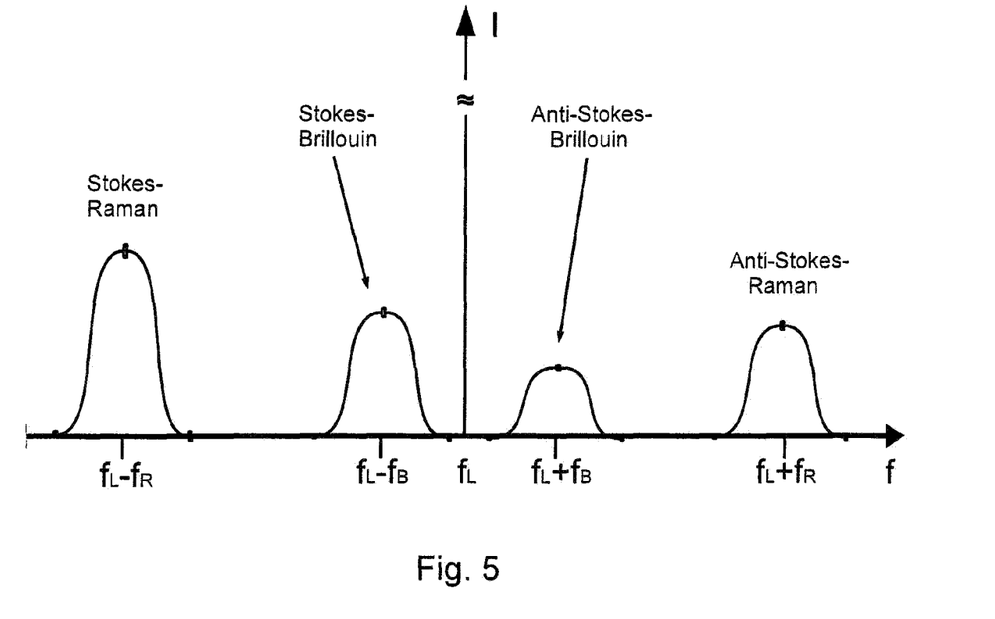
FIG. 5 is a scheme of a frequency distribution of scattered light, which is generated by inelastical scattering processes (Raman-scattering and Brillouin-scattering) in a crystal structure, such as a glass fiber and by irradiating of monochromatic light.

The light pulses 212 are coupled into the light guide fiber 210, are guided therein (in the direction of the dart 214, shown in FIG. 2) to the temperature sensitive portion (not shown) and generate light pulses with the frequencies, or, respectively, frequency bands, which are different from the frequency $f_L$ of the light, coupled in, such as schematically shown in FIG. 5, via inelastic scattering processes, in particular, including the so-called Raman-Scattering and the Brillouin-Scattering.

In the case of an inelastic Raman-Scattering process, the light 212, coupled in, with the frequency $f_L$ interacts with molecules or, respectively, molecule compounds in the temperature sensitive portion of the sensor glass fiber 210. Thereby, the molecules or, respectively, molecule compounds conduct thermal oscillations with a characteristic frequency $f_R$ (the so-called Raman-frequency). By the interaction of the light, coupled in, with the frequency $f_L$ with the characteristic frequency of oscillation $f_R$ of the molecule or, respectively, the molecule compound, mixed frequencies $f_L+f_R$ and $f_L-f_R$ or, respectively, corresponding frequency bands are generated, which are referred to as anti-stokes-Raman or, respectively, stokes-Raman distributions of light intensity (see FIG. 5). In a quantum-physical view, respective light quantums with a frequency $f_L$ interact with the molecule or, respectively, the molecule compound with the characteristic frequency $f_R$, which is capable to oscillate. A light quantum of the frequency $f_L$ can excite the molecule or, respectively, the molecule compound, which is capable to oscillate, to a higher state of oscillation, that is higher in frequency by the characteristic frequency $f_R$ according to the so-called stokes-Raman scattering process, and thereby diminish the light frequency of the same to the so-called stokes-Raman frequency $f_L-f_R$. A light quantum with stokes-Raman frequency $f_L-f_R$ or, respectively, a light pulse 216 returns back towards the measurement apparatus 200 in the direction of the dart 218, shown in FIG. 2, is coupled out by the light out-coupling device 220 to the measurement light guide 222 and is guided through a filter 232 to a photodetector 224. The photodetector 224 converts the received light pulse to an electrical detector output signal 216. This is amplified in a signal amplifier 228 and is transformed to a form, which is countable for an digital counter (electrical current or, respectively, of a voltage pulse), and is counted by a counter, which is provided in the sampling and value determination unit 206. In the measurement light channel, an optical filter 232 is provided upstream to the photodetector 224, which serves for transmitting the light in corresponding frequency bands, which was generated by inelastic scattering processes, and to block light of other frequencies, in particular, to block the light of the laser excitation frequency $f_L$ with high intensity.

In addition to the stokes-Raman light of the frequency $f_L-f_R$, which is shifted to a higher state of oscillation by exciting the molecule or, respectively, the molecule compound, as described before, light with the frequency $f_L+f_R$ is generated by another process, the so-called anti-stokes-Raman process. In a quantum physical kind of view, the molecule or, respectively, the molecule compound is located in a higher state of oscillation at the beginning of this process, shares a part of oscillation energy with the light quantum upon interaction with the light quantum of the frequency $f_L$, and is thereby transferred to a lower level of oscillation by a frequency, which is lower by the characteristic frequency $f_R$. The light quantum takes up the shared energy, whereby the frequency of the same is increased from the value $f_L$ to the value $f_L+f_R$. The so-called anti-stokes-Raman light with a frequency of $f_L+f_R$ is detected in a second measurement channel 220', 232', 224', 228'.

At the operation of the fiber sensor 210 as a Raman-Fiber sensor device, the intensities of the light with the stokes-Raman frequency $f_L-f_R$ (or, respectively, the associated frequency distribution) and of the light with Anti-Stokes-Raman frequency $f_L+f_R$ (or, respectively, the associated frequency distribution) are measured and the ratio of such both light intensities is evaluated. On the basis of said intensity ratio, the temperature is evaluated in the area of the light guide fiber 210, where the inelastic scattering processes have occurred. The ratio of the intensities of Stokes-Raman light and of the Anti-Stokes-Raman light depends on the temperature, because the ratio of the number of molecules or, respectively, molecule compounds, which are located in the higher state of oscillation at the begin of the inelastic scattering process, to the number of the molecules or, respectively, molecule compounds, which are located in a lower state of oscillation, that means the occupation probability of the higher state of oscillation, depends on the temperature.

The eigenfrequency of oscillation $f_R$ of the molecule or, respectively, the molecule compound depends essentially not on the temperature, but is a predefined parameter, which is characteristic for the type of the molecule or, respectively, the molecule compound. Correspondingly, the filter characteristics or, respectively, the frequency responses of the optical filter 232 or, respectively, 232' (for example, the so-called monochromator devices) can be chosen for the detection of Stokes-Raman light or Anti-Stokes-Raman light, or be adjusted in advance.

Practically, the probability for inelastic Raman-scattering processes is in an order of magnitude of $1:10^6$ or is less than the probability of elastical scattering processes, if compared. Therefore, the light returning from the light guide fiber 210, comprises a very high fraction of intensity of elastically scattered light with a frequency $f_L$ as well as the Stokes-, respectively Anti-Stokes light frequency bands, which are very much weaker in relation of the scattering probability with respect to their intensity (see FIG. 5). However, the different intensities of the Stokes- and Anti-Stokes light distribution pair can be measured in the sampling and value determination unit 206 by measuring over a longer period or, respectively, by averaging, and the ratio of intensities can be evaluated for the determination of temperature.

The operation of the glass fiber (fiber sensor) 210 as a Brillouin-Fiber sensor device is based on another inelastic light scattering process, the so-called Brillouin-scattering. In the case of the Brillouin-scattering, the excitation light of the frequency $f_L$, which is generated and transferred by the light source (the laser 202), interacts with the lattice vibrations of the material of the glass fiber, that means of the glass in the temperature sensitive area. Herein, lattice vibrations are to be understood as vibrations, which a molecule or, respectively, a molecule compound of a material (the glass) performs in relation to the surrounding molecules or, respectively molecule groups. The lattice vibrations have characteristic eigenfrequencies $f_B$, which are smaller than the intermolecular vibrations (with frequencies $f_R$), which occur within a molecule or, respectively, a molecule group, and which effect the Raman-scattering.

The eigenfrequency (the Brillouin-frequency $f_B$) of the lattice vibrations depends on the temperature. At the operation of a sensor fiber as a Brillouin-Fiber sensor, the change of the frequency of the excitation light, having a evaluation $f_L$, to the value $f_L+f_B$ or, respectively, the value $f_L-f_B$ is evaluated, that means the frequency change $f_B$, which corresponds to the lattice vibration eigenfrequency, and is used for the determination of the temperature.

Similar to the Raman-scattering, in the case of the Brillouin-scattering interference frequencies $f_L+f_B$ or, respectively, $f_L-f_B$, are generated by the interaction of the excitation light with the frequency $f_L$ with lattice vibrations with eigenfrequency $f_B$. If seen in the quantum physical picture, a light quantum with a frequency $f_L-f_B$ (stokes-Brillouin light) is generated, if the excitation light (frequency $f_L$) excites a lattice vibration or, respectively, shifts the same to a higher vibration level and, thereby, transfers energy or, respectively, reduces its frequency by the quantity of the frequency of the excited lattice vibration. A light quantum with the frequency $f_L+f_B$ (so-called anti-stokes-Brillouin light) is generated, if an active lattice vibration is transferred to a lower vibrational state upon interaction with the excitation light (frequency $f_L$) and, thereby, transfers energy to a quantum of excitation light, which thereby increases its frequency by the lattice vibration.

Further details for the evaluation or, respectively, the determination of the temperature at the operation as Raman- or, respectively, Brillouin-Fiber sensor are not substantial for the invention and, therefore, are not further described.

FIG. 3 shows schematically a sensor fiber 310, which is configured as a temperature sensor, and a measurement apparatus 300, which stands in optical, operational connection with the sensor fiber for the operation of the same. The sensor fiber 310 comprises a light guiding core area 311, which extends through the overall longitudinal extension of the sensor fibers 310, and an optically insulating jacket (not shown), which surrounds said core area 311. The sensor fiber 310 comprises a temperature sensitive area 350 in an area of its longitudinal extension, where a luminescent crystal 340, being the underlying temperature sensitive element, is arranged in optical communication with the core area 311. The temperature sensitive area 350 with the luminescent crystal 340 is arranged at a position, which is especially appropriate for the measurement of the temperature, within the apparatus, which works according to galvanic principles, during operation, for example within the glass fiber structures 16, 26, 36 of the cathode, anode or, respectively, separator device shown in FIG. 1. Another portion of the sensor fiber 310 is arranged outside of the apparatus, which works according to galvanic principles, and is connected to the measurement apparatus 300.

The measurement apparatus 300 is an embodiment, which is modified for the operation of the sensor fibers 310 with the luminescent crystal 340, if compared with the measurement apparatus, such as it is shown in FIG. 2. The measurement apparatus 300 comprises a light emitting diode (LED) 302 as the laser light source, a half-transparent mirror 320 as the light in-coupling, or, respectively out-coupling device, an optical filter 332 for blocking of the light with the wavelength of the laser light source and for transferring of the luminescent light 316, generated in the crystal 340, and a photodiode 324 as photodetector, which receives a part of the luminescence light 316', to be detected, and converts the same into an electrical detector output signal 326 or, respectively, $S_2$. The detector output signal 326 is amplified by an electrical signal amplifier (not shown) if required, and is fed to a sampling and value determination unit (not shown). The latter evaluates the signal and determines the temperature, which corresponds to the signal.

During operation, the light emitting diode 302 generates a light signal $S_1$ (t), which is appropriate with respect to its intensity, with a wavelength distribution, which comprises the wavelength $\lambda_1$, which is appropriate for the excitation of a luminescence light in the crystal 340. The luminescence excitation light 312, which is emitted by the LED 302, is coupled in into the light guiding core area 312 of the sensor fibers 310, for example by an objective, or, respectively, focusing device (not shown), runs by being guided by the sensor fibers 310 to the crystal 340 (such as indicated in FIG. 3 by darts 312) and generates, in the crystal 340, luminescence light with a wavelength $\lambda_2$, which is specific for the crystal 340, or, respectively, with a wavelength $\lambda_2$, in particular as a maximum of the encompassing wavelength distribution. A part of the luminescence light, which is excited in the crystal 340 or, respectively, generated, is returned to the measurement apparatus 300 by the sensor fibers 312 (such as indicated in FIG. 3 by darts 316) is reflected by the half-transparent mirror 320 in the direction to the photodetector 324, passes the optical filter 332 and reaches the photodetector 324, which converts the luminescent light 416' to the electrical detector output signal 326.

With a measurement arrangement 300, which was generally described before with reference to FIG. 3, two different kind of temperature measurements are possible, depending on the type or, respectively, the choice of the crystal 340. First, it can be utilized that the wavelength $\lambda_2$ of the luminescent light 316 depends on the temperature of the crystal 340. For example, gallium arsenide doped with aluminium (Al:GaAs) shows a particularly clear distinctive dependency of the wavelength of the luminescence light on the temperature. For the measurement of the temperature dependency of the wavelength, the optical filter 332 is configured as a tunable, wavelength selective filter element, for example as a so-called optical monochromator.

According to the other kind of temperature measurement, the dependency of the decay time of a luminescence light pulse on the temperature can be utilized. A temperature-dependent decay time of luminescent light pulses is known for the crystals zinc sulphide (ZnS) or yttrium aluminium garnet (Cr:YAG), for example. For the measurement of the temperature-dependency of the decay time of a light pulse, the crystal 340 is excited with a light signal $S_1(t)$, which has a temporary modulated density. The light signal $S_1(t)$ can provide a rectangular shaped change of intensity (rectangular function) as a function of time or a step shaped change of intensity (step function). In response to the excitation by a light intensity, modulated by such a saltus function, the crystal (e.g. ZnS, Cr:YAG) shows a luminescence light, whose intensity changes over time or according to an exponential function, for example. A sampling and value determination device (not shown) records the time dependency of the signal 326, which is generated in the photodetector 324 by the luminescence light 316, or, respectively, $S_2(t)$ and determines therefrom the temperature of the crystal 340, for example, by forming of a temporal derivative (differentiation with respect to the time), if the luminescence light intensity, which is excited by a saltus function, changes according to an exponential function, the sampling and value determination unit determines as a measure for the temperature of the crystal 340 a value, which is reciprocal to the temporal derivative, to evaluate the so-called decay time of the luminescence light intensity.

With reference to FIG. 4, a further optical measurement method is explained in the following, which is appropriate for the temperature measurement in a temperature sensitive area 350 in a sensor fiber 410. The sensor fiber 410 shown schematically enlarged in FIG. 4, comprises a light-guiding core area 411, and an optically shielding jacket 413, which surrounds the core area 411, as well as a portion of the core area 411, which is configured as a temperature sensitive area 450, where a periodical modulation of refractive index 426 is formed. The modulation of refractive index 426, formed in the glass fiber 410, is also referred to as Fiber-Bragg-grate, herein.

The Fiber-Bragg-grate or, respectively, the modulation of refractive index 426 comprises a characteristics of the refractive index 428, which is formed in the core area 411 along the propagation direction of the irradiated light 412 or, respectively, $L_{in}$, for example, sinusoidal-shaped (see the illustration shown in the lower area of FIG. 4). For exemplification, a plurality of periods (in the Example 5) of the modulation of the refractive index 426 is shown in FIG. 4 within the temperature sensitive area 450 of the glass fiber 410. For the further exemplification, only two spatially adjacent periods of the modulation 426 of the refractive index n are shown in the lower area of the Picture 428 in FIG. 4 as a function of longitudinal position (coordinate I) in the sensor fiber 410, in particular, with their maxima or, respectively, minima, which are spaced by a distance (period length) $\Lambda$.

For irradiated light 412 with a continuous spectrum of wavelengths (a distribution of intensities $P_i$ of the in-coupled light $L_{in}$, shown in the left upper corner of FIG. 4 in the Picture 470), the modulation of refractive index 426 acts as a wavelength-selective mirror in the case of a reflection (as illustrated by the distribution of intensities $P_r$ of the refractive light $L_r$ in Picture 472, in the left lower corner of FIG. 4), and, in transmission case, as a wavelength-selective band filter (such as illustrated by the distribution of intensities $P_t$ of the transmitted light $L_t$ in the Picture 474 in the right lower corner in FIG. 4).

In the light 417, which is transmitted by the modulation of refractive index 426, or, respectively, $L_t$ (compare the distribution intensity 474 in FIG. 4) the fractions of the light 416, which is reflected at the modulation of reflective index 426, or, respectively, $I_r$, are missing with respect to the irradiated light 412 or, respectively, $L_{in}$ (compare the intensity in FIG. 4). Correspondingly, the intensity distribution 474 of the transmitted light shows a narrow-band dip with a minimum at the same wavelength $\lambda_B$, where the intensity distribution of 472 of the reflected light provides its maximum.

The Picture 472 (that is the intensity distribution of the light 416, which is reflected at the modulation of refractive index 426, as a function of the light wavelength $\lambda$) shows a narrow-band intensity distribution with a clearly distinctive maximum at a certain wavelength $\lambda_B$. Said wavelength $\lambda_B$ is proportional to the distance (of the period length) $\Lambda$ of two adjacent periods of the modulation of refractive index 426. It can be shown that the following relation applies:

$$\lambda_B = 2 \times n_{eff} \times \Lambda$$

In this equation, $n_{eff}$ is the effective index of refraction, that is the average index of refraction of the characteristics of refraction index n(I), as shown in Picture 428, Λ the period length of the modulation of refractive index 426 and $\lambda_B$ the wavelength at the maximum of the narrow-band intensity distribution of the reflected light (see Picture 472) or, respectively, the wavelength at the minimum of the narrow-band intensity distribution of the transmitted light (see Picture 474), the so-called Bragg-wavelength.

The relationship between the Bragg-wavelength $\lambda_B$ of the reflected or, respectively, transmitted light and the period length Λ of the modulation of refractive index 426, as described by the equation shown above, can be understood concretely as result of a so-called constructive superposition (interference), that means mutually amplifying superposition of part-waves of light, which is reflected or, respectively, transmitted at different, adjacent periods of the modulation of refractive index 426. The condition for a constructive superposition (interference) at the reflection of part waves, explained with reference to Picture 426 in FIG. 4, is that the optical path 460 of a first part wave, which is reflected at a first period of the modulation of refractive index 426, differs from the optical path 426 of a second part wave, which is reflected at an adjacent period of the modulation of refractive index 426 by the wavelength λ of the irradiated light (or by a whole-number multiplicator). The optical path difference corresponds to the double period length Λ of the modulation of refractive index 426.

Due to the temperature-dependent length change of glass fiber 410 in the temperature sensitive area 450, also the distance Λ of two adjacent periods of the modulation of refractive index 426 changes, and also, according to the relationship explained above, the wavelength $\lambda_B$ of the maximum of intensity spectrum 472 of the reflected light $L_r$ 416. Correspondingly, for the temperature measurement method using the Fiber-Bragg-grate, the wavelength $\lambda_B$ of the maximum (or, respectively, the minimum) of the intensity spectrum 472 (or, respectively, 474) of the reflected (or, respectively, transmitted) light is determined and the temperature in the temperature sensitive area 450 (with the Fiber-Bragg-grate) is determined therefrom.

A Fiber-Bragg-grate or, respectively, a periodical modulation of refractive index 426 can be fabricated by means of a photolithographic method, for example, as follows. First, a glass fiber 410 with a photosensitive core area 411 is provided. With the aim to generate therein a spatially periodic modulation of refractive index 426 (i.e. a Fiber-Bragg-grate) in the glass fiber 410, a spatially modulated distribution of the short-wavelength light is generated and irradiated into the photosensitive area 450 of the glass fiber 410, which is to be configured temperature-sensitive, by using a mask with a periodically modulated transparence for the short-wavelength light, for example, UV-light.

The term photosensitive or, respectively, photosensitive material is herein understood to mean that the index of refraction of the photosensitive material (such as the core area 411, which is to be configured in the Fiber-Bragg-grate) for wavelengths in an optically measureable wavelength range is capable to be changed by irradiation of comparably relative short-wavelength light, for example UV-light, as a function of the dose of the irradiated, relatively short-wavelength light. Thereby, the changed index of refraction influences the propagation of light in the optical wavelength range, as it is used in the operation of the sensor fiber as a temperature sensor as measurement light 412 and is not further changed by said light.

All features disclosed in the application documents, are claimed to be relevant for the invention if they are new against the prior art alone or in combination.

REFERENCE LIST

2 Apparatus, working according to galvanic principles
10 cathode
12 current arrester (cathode)
14 active mass (cathode)
16 glass fiber structure (cathode)
18 sensor fiber to the cathode
20 anode
22 current arrester (anode)
24 active mass (anode)
26 glass fiber structure of the anode
28 sensor fiber to the anode
30 separator device
32 separator material
36 glass fiber structure
38 sensor fiber to the separator
40 housing device
42 glass fiber lead through
200 measurement apparatus
202 laser light source
204 control unit
206 sampling and value determination unit
208 computer
210 glass fiber (sensor fiber)
212 transferred light pulse
214 running direction of the transferred light pulse
216 light pulse to be received (measurement light pulse)
218 running direction of the light pulse to be received
220 light out-coupling device
222, 222' measurement light guide
224, 224' photodetector
226, 226' detector output signal
228, 228' signal amplifier
230, 230' amplifier output signal
232, 232' optical filter
300 measurement apparatus
302 laser light source (e.g. LED)
310 glass fiber
311 core area
312 irradiated light (excitation light)
316, 316' luminescence light
320 semi-transparent mirror
332 filter
324 photodetector (e.g. photodiode)
326 detector output signal $S_2$
340 luminescent crystal
350 temperature sensitive area
410 glass fiber
411 core area
412 irradiated light
413 jacket
416, $L_r$ reflected light
417, $L_t$ transmitted light
426 modulation of refractive index (schematic)
428 characteristics of refractive index (spatially resolved, idealized)
450 temperature sensitive area
460 path of a first reflected wave front
462 path of a second reflected wave front
464 path of a transmitted wave front
470 intensity spectrum of the irradiated light $L_{in}$
472 intensity spectrum of the reflected light $L_r$
474 intensity spectrum of the transmitted light $L_t$

The invention claimed is:

1. An apparatus which works according to galvanic principles, in particular a lithium-ion accumulator or a lithium-ion cell, having at least two electrode devices, including a cathode and an anode, and a separator device being arranged between two electrode devices, characterized in that the apparatus comprises at least one glass fiber operable as a temperature sensor, wherein the at least one glass fiber is arranged at a surface of, or embedded into a surface-like portion of, the separator device.

2. The apparatus according to claim 1, characterized in that a first portion of the at least one glass fiber is arranged within a housing device and a second portion of the glass fiber is arranged outside of the housing device.

3. The apparatus of claim 2, characterized in that:
the at least one glass fiber guides light at least in a portion of the glass fiber, said light being prepared for the execution of a temperature measurement, and guides light, which is prepared for the transfer of data;
the apparatus comprises a net formed by glass fibers, or the apparatus comprises an arrangement of a plurality of glass fibers, which are arranged substantially in parallel to each other, wherein at least one glass fiber is operable as a temperature sensor;
the at least one glass fiber that is operable as a temperature sensor, is arranged at a surface of, or embedded into a surface-like portion of, the separator device; or is arranged at a surface of, or embedded into, at least one of the electrode devices; and
the apparatus further comprises at least one housing device, and the at least one glass fiber is attached to or in at least one of the electrode devices and the separator device in a first portion, which is operable as a temperature sensor, and the at least one glass fiber is attached at or in the housing device in a second portion.

4. The apparatus of claim 3, characterized in that:
a luminescent crystal is arranged in at least one portion of the glass fiber, which is operable as a temperature sensor, said crystal being in optical communication with a light-guiding core area of the glass fiber; wherein at least one of the wavelength ($\lambda_2$) of the luminescence light generated in the crystal depends on the temperature of the crystal and that the crystal contains Al:GaAs; and
the decay time of a luminescence light intensity, which was excited in the crystal by light, which is modulated with respect to its intensity, depends on the temperature of the crystal and that the crystal contains ZnS or Cr:YAG.

5. The apparatus of claim 3, characterized in that a Fiber-Bragg-grate is configured in at least one portion of the at least one glass fiber, the Fiber-Bragg-grate being in optical communication with a light-guiding core area of the glass fiber, and that the Fiber-Bragg-grate comprises a temperature dependent, periodical variation of refractive index, which is configured in longitudinal direction of the glass fiber.

6. The apparatus of claim 3, characterized in that:
at least one glass fiber is operated as at least one of a Raman-Fiber sensor device, and a Brillouin-Fiber sensor device in at least a portion of the glass fiber for the measurement of temperature; and
the operation as a Raman-Fiber sensor device or as a Brillouin-Fiber sensor device comprises a spatially resolved operation, which is directed to the portion and is based on a propagation time measurement of light pulses.

7. The apparatus according to claim 1, characterized in that the at least one glass fiber guides light at least in a portion of the glass fiber, said light being prepared for the execution of a temperature measurement, and guides light, which is prepared for the transfer of data.

8. The apparatus according to claim 1, characterized in that the apparatus comprises a net formed by glass fibers, wherein at least one glass fiber is operable as a temperature sensor.

9. The apparatus according to claim 1, characterized in that the separator device comprises a net formed by glass fibers, wherein at least one of the glass fibers is operable as a temperature sensor.

10. The apparatus according to claim 1, characterized in that the at least one glass fiber that is operable as a temperature sensor, is arranged at a surface of, or embedded into, at least one of the electrode devices.

11. The apparatus according to claim 10, characterized in that a structure of glass fibers, arranged in parallel to each other, or a net formed by glass fibers, is embedded into the at least one electrode device or floats on the at least one electrode device and at least one of the glass fibers is operable as a temperature sensor.

12. The apparatus according to claim 1, characterized in that the apparatus further comprises at least one housing device, and that the at least one glass fiber is attached to or in at least one of the electrode devices and the separator device in a first portion, which is operable as a temperature sensor, and the at least one glass fiber is attached at or in the housing device in a second portion.

13. The apparatus according to claim 1, characterized in that a luminescent crystal is arranged in at least one portion of the glass fiber, which is operable as a temperature sensor, said crystal being in optical communication with a light-guiding core area of the glass fiber.

14. The apparatus according to claim 13, characterized in that the wavelength ($\lambda_2$) of the luminescence light generated in the crystal depends on the temperature of the crystal and that the crystal contains Al:GaAs.

15. The apparatus according to claim 13, characterized in that the decay time of a luminescence light intensity, which was excited in the crystal by light, which is modulated with respect to its intensity, depends on the temperature of the crystal and that the crystal contains ZnS or Cr:YAG.

16. The apparatus according to claim 13, characterized in that a Fiber-Bragg-grate is configured in at least one portion of the at least one glass fiber, the Fiber-Bragg-grate being in optical communication with a light-guiding core area of the glass fiber, and that the Fiber-Bragg-grate comprises a temperature dependent, periodical variation of refractive index, which is configured in longitudinal direction of the glass fiber.

17. The apparatus according to claim 13, characterized in that at least one glass fiber is operated as at least one of a Raman-Fiber sensor device, and a Brillouin-Fiber sensor device in at least a portion of the glass fiber for the measurement of temperature.

18. The apparatus according to claim 17, characterized in that the operation as a Raman-Fiber sensor device or as a Brillouin-Fiber sensor device comprises a spatially resolved operation, which is directed to the portion and is based on a propagation time measurement of light pulses.

19. The apparatus of claim 1, characterized in that the apparatus comprises an arrangement of a plurality of glass fibers, which are arranged substantially in parallel to each other, wherein at least one glass fiber is operable as a temperature sensor.

* * * * *